United States Patent [19]

Iwamura et al.

[11] Patent Number: 5,374,699
[45] Date of Patent: Dec. 20, 1994

[54] THERMOSETTING RESIN COMPOSITION

[75] Inventors: Goro Iwamura, Sakai; Hiroshi Kinoshita, Suita; Asako Kometani, Sakai, all of Japan

[73] Assignee: Dainippon Ink and Chemicals, Inc., Tokyo, Japan

[21] Appl. No.: 192,582

[22] Filed: Feb. 7, 1994

Related U.S. Application Data

[63] Continuation-in-part of Ser. No. 885,544, May 19, 1992, abandoned, which is a continuation-in-part of Ser. No. 798,989, Dec. 2, 1991, abandoned, which is a continuation of Ser. No. 589,211, Sep. 28, 1990, abandoned.

[30] Foreign Application Priority Data

Sep. 29, 1989 [JP] Japan ................................. 1-254803
Jul. 10, 1990 [JP] Japan ................................. 2-180604

[51] Int. Cl.$^5$ ........................................... C08L 69/00
[52] U.S. Cl. .................................. 526/269; 525/327.2; 525/327.4; 525/329.5; 525/328.8; 525/384; 525/386; 525/395; 526/270; 526/314; 526/317.1; 528/370; 528/371; 549/230; 549/3
[58] Field of Search ............... 526/269; 525/327.2; 528/370, 371

[56] References Cited

U.S. PATENT DOCUMENTS

| | | |
|---|---|---|
| 2,722,525 | 11/1955 | Price . |
| 2,847,398 | 8/1958 | Gluesenkamp . |
| 2,847,402 | 8/1958 | Gluesenkamp . |
| 2,970,983 | 2/1961 | Newey ........................ 528/89 |
| 2,979,514 | 4/1961 | O'Brien . |
| 3,225,009 | 12/1965 | D'Alelio . |
| 4,111,965 | 9/1978 | Wu . |
| 4,474,951 | 10/1984 | Pope . |
| 4,772,666 | 9/1988 | Just ........................... 525/185 |
| 4,788,278 | 11/1988 | Mauz . |
| 4,839,439 | 6/1989 | Mauz . |
| 4,916,189 | 4/1990 | Fontana ...................... 525/186 |
| 4,931,509 | 6/1990 | Yagishita . |
| 4,933,030 | 6/1990 | Kessler . |

FOREIGN PATENT DOCUMENTS

| | | |
|---|---|---|
| 001088 | 3/1979 | European Pat. Off. . |
| 1088 | 3/1979 | European Pat. Off. . |
| 0272664 | 6/1988 | European Pat. Off. . |
| 0274721 | 7/1988 | European Pat. Off. . |
| 0358358 | 3/1990 | European Pat. Off. . |
| 0394786 | 10/1990 | European Pat. Off. . |

OTHER PUBLICATIONS

Billmeyer, Jr. F. W., "Textbook of Polymer Science", 3rd Ed. 509–510 (1984) Wiley, (New York).
Lee, H. et al., Handbook of Epoxy Resins (10-4-10-5), 1967, McGraw Hill (New York).
Chemical Abstracts, vol. 112, No. 6, 5 Feb. 1990, Columbus, Ohio, US, Abstract #38280K, "Storage-stable low-temperature-curable coating composition" p. 138.
Chemical Abstracts, vol. 112, No. 4, 22 Jan. 1990, Columbus, Ohio, US, Abstract #22453H, "Low-temperature-curable coating composition", p. 89.

*Primary Examiner*—Fred Zitomer
*Attorney, Agent, or Firm*—Sherman and Shalloway

[57] ABSTRACT

A thermosetting resin composition which comprises (A-2) a vinyl polymer having at least one each of 2-oxo-1,3-dioxolan-4-yl group and a carboxyl group together on the polymer and a catalyst (B) effective for ring-opening the 2-oxo-1,3-dioxolan-4-yl group and curing said vinyl polymer, and related resin compositions.

19 Claims, No Drawings

THERMOSETTING RESIN COMPOSITION

This application is a continuation-in-part application of Ser. No. 07/885,544 filed on May 19, 1992, now abandoned, which is a continuation-in-part application of Ser. No. 07/798,989 filed on Dec. 2, 1991, now abandoned, which is continuation application of Ser. No. 07/589,911 filed on Sep. 28, 1990, now abandoned.

This invention relates to a novel and useful thermosetting resin composition. In particular, this invention relates to various thermosetting resin compositions of a curing system comprising as basal components a specified resin of a vinyl polymer having at least one, preferably at least two 2-oxo-1,3-dioxolan-4-yl groups (hereinafter, also referred to as cyclocarbonate groups) in one molecule, and a specific curing catalyst mainly comprising a ring opening catalyst of this cyclocarbonate group; a curing system comprising as basal components a specified resin of a vinyl polymer having a cyclocarbonate group and a carboxyl group together, and the above specific curing catalyst; a curing system comprising as basal components the specified resin of the cyclocarbonate group containing resin, the specific curing catalyst, and a specific compound having at least two carboxyl groups and/or an acid anhydride group in one molecule; and a curing system comprising as basal components the above respective resins, the curing catalyst, a specific compound having at least two carboxyl groups in one molecule, and a specific curing agent having reactivity with a hydroxy group.

Recently, there is a trend to attach importance to coat appearance with the automobile industry as the central figure.

However, on the problems of maintenance of coat appearance such as deterioration under exposure, above all, lowering of appearance by acidic rain, to say nothing of the problem, particularly, of the finished appearance after coating and baking, a coating now in use comprising a combination of an aminoplast curing agent and an acrylic polyol has come to be no longer able to satisfy such required performances.

In such trend, there have step by step been developed and investigated various coatings of a curing system comprising a combination of a polyol type resin and an isocyanate prepolymer; a curing system comprising a combination of a silanol group-containing resin and an epoxy group containing resin; a trialkoxysilyl group-based humidity curing system; a curing system comprising a combination of a hydroxyl group containing resin and an acid anhydride group containing resin, and the like.

However, among those coating systems, the polyol type resin/isocyanate prepolymer system has a short pot life and thus has a large drawback in the aspect of workability.

Further, in case of the curing system of a silanol group containing resin and an epoxy group containing resin and the humidity curing system of a trialkoxysilyl group, difference in curability based on coating and baking conditions occurs and in addition appearance is not satisfactory.

Further, it is the present state of things that, in addition to the problems of a long-term shortage stability, coat appearance and the like, there has come to be strongly desired with the automobile industry as the central figure urgent development of a curing system which is capable of obtaining a coat withstanding acidic rain and thus extremely useful.

Thus, in order to eliminate or solve various drawbacks or problems in prior art as described above, and in addition in order to comply with such desires as described above, the present inventors started research diligently.

Thus, the problem to be solved by the invention is to provide an extremely useful resin composition for a one-can coating which is not only excellent in storage stability, but also excellent in acidic resistance, weather resistance, and coat appearance such as smoothness, and so on.

Thus, the present inventors set their sight on the problems to be solved by the invention, and diligently studied. As a result, they fund that any of [1] a thermosetting resin composition which comprises as indispensable coat-forming components a vinyl copolymer having a 2-oxo-1,3-dioxolan-4-yl group, above all, a group represented by the general formula

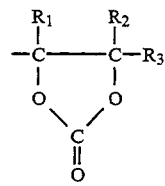

(wherein $R_1$, $R_2$ and $R_3$, which may be the same or different, each represent a hydrogen atom or an alkyl group having 1 to 4 carbon atoms) or a vinyl copolymer having a cyclocarbonate group and a carboxyl group together; and one or more compounds selected from the group consisting of a vinyl copolymer, a polyester resin and a low molecular compound, each having a carboxyl group and/or an acid anhydride group, and further, wherein a ring opening catalyst of the cyclocarbonate group is also compounded, or [2] thermosetting resin composition wherein a compound having reactivity with a hydroxyl group, i.e. a curing agent is compounded into a vinyl copolymer having a cyclocarbonate group and a hydroxyl group together and a compound having a carboxyl group and a hydroxyl group together, and further, a ring opening catalyst of the cyclocarbonate group is also compounded thereinto is excellent in storage stability and thus gives a one-can coating whose workability is good, and moreover gives a coat excellent in weather resistance and coat appearance and so on, not to mention acid resistance, and completed the invention.

That is, the invention provides a thermosetting resin composition comprising as indispensable components a vinyl polymer (A-1) having at least one cyclocarbonate group, especially a specific group as represented by the above general formula [I] (this applies as well in the following), and a curing catalyst (B); a thermosetting resin composition comprising the above vinyl polymer (A-1) and curing catalyst (B), and further a compound (C-1) having at least two carboxyl groups and/or an acid anhydride group in one molecule; or a thermosetting resin composition comprising the above vinyl polymer (A-1) and/or (A-2), the curing catalyst (B), a compound (C-2) having at least two carboxyl groups in one molecule, and a curing agent (D) which is capable of reacting with a hydroxyl group.

In the above, the vinyl polymer (A-1) having at least one cyclocarbonate group in one molecule, especially a vinyl polymer having at least one, preferably at least two cyclocarbonate groups and a hydroxyl group together in one molecule can include, for example, one obtained by a copolymerization reaction of a compound (a-1) having together in one molecule one $\alpha,\beta$-ethylenic unsaturated double bond (hereinafter also referred merely to as an unsaturated bond) and at least one such cyclocarbonate group as represented by the above general formula [I] with a compound having one unsaturated bond and at least one hydroxyl group together in one molecule and/or another polymerizable unsaturated monomer; one obtained by addition reacting a polyisocycanate compound such as hexamethylenediisocyanate with a known and conventional hydroxyl group containing vinyl polymer, and then addition reacting a carbonate monoalcohol such as glyceryl carbonate therewith; one obtained by addition reacting a carbonate monoalcohol with a known and conventional isocyanate-ethyl (meth)acrylate copolymer; or one obtained by addition reacting a carbonate monoalcohol with a known and conventional acid chloride group containing polymer. Among them, one obtained by copolymerization of the compound (a-1) with the hydroxyl group containing polymerizable unsaturated monomer is particularly recommended due to its particular convenience.

Particularly representative examples of a compound having together one polymerizable unsaturated double bond and at least one cyclocarbonate group in one molecule and being used in obtaining the vinyl copolymer containing at least two cyclocarbonate groups in the molecule acrylate series compounds represented by the general formula

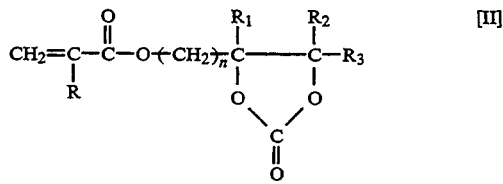

(wherein R represents a hydrogen atom or a methyl group, $R_1$, $R_2$ and $R_3$ are as defined above, and n is an integer of 1 to 6), for example, 2,3-carbonatopropyl (meth)acrylate, 2-methyl-2,3-carbonatopropyl (meth)acrylate, 3,4-carbonatobutyl (meth)acrylate, 3-methyl-3,4-carbonatobutyl (meth)acrylate, 4-methyl-3,4-carbonatobutyl (meth)acrylate, 4,5-carbonatopentyl (meth)acrylate, 6,7-carbonatohexyl (meth)acrylate, 5-ethyl-5,6-carbonatohexyl (meth)acrylate and 7,8-carbonatooctyl (meth)acrylate. In addition to these compounds, there can be exemplified compounds of vinyl series and the like such as 2,3-carbonatopropyl vinyl ether, methyl-2,3-carbonatopropyl maleate and methyl-2,3-carbonatopropyl crotonate.

The pertinent use amount of these compounds is within the range of 1 to 70 parts by weight, preferably 5 to 35 parts by weight.

In case of less than 1 part by weight, the effect of such a compound can by no means be expected, and on the other hand when such a compound is used in an excessively large amount beyond 70 parts by weight, a hard and brittle coat is inevitably obtained due to the remaining cyclocarbonate group, and thus both cases are not desired.

The another vinyl monomer copolymerizable with an unsaturated monomer containing a cyclocarbonate group is not particularly limited, but copolymerization with an unsaturated monomer further containing as functional group(s) a hydroxyl group and/or a carboxyl group enables to enhance the effects of the invention.

Particularly representative examples of such hydroxyl group containing unsaturated monomers include $\beta$-hydroxyalkyl (meth)acrylates such as 2-hydroxyethyl (meth)acrylate and 4-hydroxybutyl (meth)acrylate; 2-hydroxyalkyl vinyl ethers such as 4-hydroxybutyl vinyl ether; and allyl compounds such as allyl alcohol and hydroxyethyl allyl ether; and hydroxyl group containing unsaturated monomers wherein $\epsilon$-caprolcatone was linked to the above various monomers.

The introduction of a hydroxyl group causes a reaction with the carbonate, induces the increase of the crosslinking density, and thereby enhances the solvent resistance and weather resistance.

Further, a carboxyl group containing unsaturated monomer (a-2) can also be used.

The use of such a carboxyl group containing monomer remarkably enhances the compatibility with the carboxyl group or acid anhydride group containing compound, and thus is particularly effective.

Particularly representative examples of the carboxyl group containing unsaturated monomer used in the invention include $\alpha,\beta$-ethylenic unsaturated mono- or dicarboxylic acids such as (meth)acrylic acid, maleic acid, fumaric acid and itaconic acid; esters of an $\alpha,\beta$-ethylenic unsaturated dicarboxylic acid and monohydric alcohol having 1 to 4 carbon atoms such as diethyl maleate, dibutyl maleate, dibutyl fumarate and diethyl itaconate; and carboxyl group containing unsaturated monomers obtained by linking an acid anhydride such as phthalic anhydride to a hydroxyl group containing vinyl monomer such as 2-hydroxyethyl (meth)acrylate; and so on.

Further, particularly representative examples of the other copolymerizable vinyl monomer (a-4) include reactive polar group—not containing various (meth)acrylates such as alkyl (meth)acrylates having an alkyl group having 1 to 22 carbon atoms, 2-ethoxethyl (meth)acrylate and cyclohexyl (meth)acrylate; reactive polar group containing various (meth)acrylates such as glycidyl (meth)acrylate; aromatic vinyl monomers such as styrene, tert-butyl styrene, $\alpha$-methylstyrene and vinyltoluene; various (meth)acrylamides such as (meth)acrylamide and N-alkoxymethylated (meth)acrylamide; and further (meth)acrylonitrile, vinyl acetate, phosphoric acid group containing (meth)acrylates and the like as well as fluorine containing vinyl monomers such as tetrafluoroethylene and hexafluoropropylene.

On the other hand, examples of the vinyl polymer (A-2) having together at least one, preferably at least two cyclocarbonate groups and a carboxyl group in one molecule include those obtained by a copolymerization reaction of a compound (a-1) having together one unsaturated bond and at least one cyclocarbonate group in one molecule such as one exemplified above, a carboxyl group containing unsaturated monomer (a-2) such as one exemplified above, tertiary amino group containing vinyl monomer, (a-3), and another copolymerizable vinyl monomer (a-4) such as one exemplified above.

Particularly representative examples of the above tertiary amino group containing vinyl monomer (a-3)

include N,N-dialkylaminoalkyl (meth)acrylates such as N,N-dimethylaminoethyl (meth)acrylate, N,N-diethylaminoethyl (meth)acrylate and N,N-diethylaminopropyl (meth)acrylate.

The pertinent use amount of the tertiary amino group containing vinyl monomer (a-3) is within the range of up to 5 parts by weight when the use amount of the total monomers is 100 parts by weight.

When it is used in an amount beyond 5 parts by weight, the resulting vinyl copolymerization resin itself is inevitably liable to be colored and further the weather resistance is doomed to be spoiled, and thus such use is not suitable.

Further, the pertinent use amount of the above carboxyl group containing vinyl monomer (a-2) is within the range of below 50 parts by weight, preferably below 50 parts by weight, and the pertinent use amount of the another copolymerizable vinyl monomer (a-4) is within the range of up to 98 parts by weight.

Particularly, when the monomer is used in an amount beyond 50 parts by weight, water resistance, weather resistance and so on inevitably are lowered due to the increase of the remaining carboxyl groups, and thus both cases are not suitable.

It is a matter of course that any of the above-mentioned various polymerizable unsaturated monomers may be used alone or in combination of two or more of them.

In preparation of the vinyl copolymers using various monomers as mentioned above, any of known and conventional polymerization methods such as a solution polymerization method and a non-aqueous dispersion polymerization method can be applied, but it is most convenient to apply a solution radical polymerization method.

Particularly representative examples of solvents used therein include hydrocarbon solvents such as toluene, xylene, cyclohexane, n-hexane and octane; ester solvents such as methyl acetate, n-butyl acetate and amyl acetate; and ketone solvents such as acetone, methyl ethyl ketone, methyl isobutyl ketone, methyl amyl ketone and cyclohexanone; and the like, and these may be used alone or in combination of two or more of them.

Particularly representative examples of the radical polymerization initiator include known and conventional ones of azo series represented by azobisisobutyronitrile and peroxide series represented by benzoyl peroxide and the like. Further, there can be used, if necessary, as a molecular weight adjusting agent a known and conventional chain transfer agent such as lauryl mercaptan, octyl mercaptan, 2-mercaptoethanol, octyl thioglycolate, 3-mercaptopropionic acid or α-methylstyrene dimer.

The pertinent number average molecular weight of the vinyl copolymerization resin to be thus obtained is in the range of 800 to 50,000, preferably in the range of 1,500 to 50,000. In case of less than 800, it inevitably becomes difficult to obtain one having the required performances, and on the other hand, the case of more than 50,000 inevitably has a bad influence on workability, etc., and thus both cases are not suitable.

Particularly representative examples of the above carboxyl group and/or acid anhydride group containing compound (C-1) include at least one compound selected from the group consisting of vinyl copolymers, polyester resins and low molecular compounds, each having the above specific functional group(s), and the like.

First, among them, the vinyl copolymer may also be one obtained by copolymerizing a carboxyl group containing unsaturated monomer and/or an acid anhydride group containing unsaturated monomer with another copolymerizable unsaturated monomer as mentioned above.

There can be used as such carboxyl group containing unsaturated monomers various ones as mentioned above.

Further, there can for example be mentioned as the acid anhydride group containing unsaturated monomer one having an acid anhydride group and an unsaturated group together represented by maleic anhydride or itaconic anhydride.

It goes without saying that there can be used as the other unsaturated monomer copolmerizable with the carboxyl group containing unsaturated monomer and/or the acid anhydride group containing unsaturated monomer any of various unsaturated monomers as mentioned above which are copolymerizable with the cyclocarbanate group containing unsaturated monomer.

There is as the carboxyl group containing polyester resin one obtained by reacting an acid component with a polyhydric alcohol in an excessive amount of the former over the latter, one obtained by reacting an acid anydride group with a hydroxyl group containing polyester resin, or the like.

The polyester resin referred to herein can be one obtained, for example, by condensing according to a known and conventional method a polyvalent carboxylic acid, maleic acid or a dimer acid with a polyol such as ethylene glycol, propylene glycol, neopentyl glycol or trimethylolpropane.

More specifically, there can be mentioned a carboxyl group-terminated unsaturated polyester resin, for example, one obtained by linking an acid anhydride group containing compound such as trimellitic acid to a hydroxyl group-terminated polyester obtained by reaction under a condition such that the polyol component becomes excessive, or one obtained by reaction under a condition such that the polyvalent carboxylic acid becomes excessive from the start.

Further, examples of the carboxyl group containing low molecular compound in the invention include adipic acid, phthalic acid, isophthalic acid, dimer acids, etc.

On the other hand, examples of the acid anhydride group containing low molecular compound include trimellitic acid, tetrahydrophthalic anhydride, hexahydrophthalic anhydride, HET anhydride, himic anhydride, maleic anhydride, itaconic anhydride, pyromellitic anhydride, glycerol tris(trimellitate), ethylene glycol di(trimellitate), etc.

It goes without saying that as particularly representative examples of the compound (C-2) having carboxyl groups in one molecule there can be mentioned among various compounds as mentioned above those having carboxyl groups alone as functional groups (reactive polar groups).

These compounds (C-1) and (C-2) act as crosslinking agents mainly of the vinyl polymers (A-1) having a cyclocarbonate group and the vinyl polymers (A-2) having a cyclocarbonate group and a carboxyl group together.

As the curing catalyst (B), a ring opening catalyst of a cyclocarbonate group is first mentioned, and a ring opening catalyst of an epoxy group is also mentioned.

Among these catalysts, first, the former cyclocarbonate group ring opening catalyst is important mainly for the decarboxylation reaction based on the cyclocarbonate group, and particularly representative examples thereof include quaternary ammonium salts such as tetramethylammonium bromide, trimethylbenzylammonium hydroxide, 2-hydroxypyridine, trimethylbenzylammonium methoxide, phenyltrimethylammonium chloride, phenyltrimethylammonium bromide, phenyltrimethylammonium hydroxide, phenyltrimethylammonium iodide, phenyltrimethylammonium tribromide, phosphocholine chloride sodium salt, stearylammonium bromide, tetra-n-amylammonium iodide, tetra-n-butylammonium bromide, tetra-n-butylammonium hydroxide, tetra-n-butylammonium phosphate, tetra-n-decylammonium trichloride, tetraethylammonium hydroxide, tetraethylammonium tetrafluoroborate, acetylcholine bromide, alkyldimethylbenzylammonium chloride, benzylcholine bromide, benzyl-n-butylammonium bromide, betaine, butyryl chloride, bis(tetra-n-butylammonium) dichromate and trimethylvinylammonium bromide; phosphonium salts such as allyltriphenylphosphonium chloride, n-anyltriphenylphosphonium bromide, benzyltriphenylphosphonium chloride, bromomethyltriphenylphosphonium bromide, 2-dimethylaminoethyltriphenylphosphonium bromide, ethoxycarbonylphosphonium bromide, n-heptyltriphenylphosphonium bromide, methyltriphenylphosphonium bromide, tetrakis(hydroxymethyl)phosphonium sulfate and tetraphenylphosphonium bromide; alkaline metal salts of phosphonic acid, alkaline metal salts of p-toluenesulfonic acid and alkaline metal salts of dimethylsulfonic acid; and carbonates such as calcium carbonate; and the like.

The pertinent use amount of the cyclocarbonate group ring opening catalyst is within the range of 0.01 to 5 parts by weight per 100 parts by the solid weight of the vinyl copolymerization resin.

Such use amount has a large influence on the temperature at the baking of the vinyl copolymerization resin with the carboxyl group containing and/or acid anhydride group containing compound. Particularly, in case of less than 0.01 part by weight, the crosslinking reaction does not occur sufficiently, and on the other hand, when the catalyst is used in an amount beyond 5 parts by weight, the storage stability of the thermosetting resin composition is extremely lowered, and moreover, the water resistance of the coat, etc. are lowered significantly, and thus both the cases are not suitable.

Further, the epoxy group ring opening catalyst is a component capable of being used to promote the reaction of the epoxy group formed by the decarboxylation reaction of the cyclocarbonate group with the carboxyl group containing and/or acid anhydride group containing compound. As such components, basic catalysts usually used to catalyze esterification reactions are preferred, and various quaternary ammonium salts as mentioned above are most preferred since they also have the effect as a cyclocarbonate group ring opening catalyst.

Further, a combined use of triphenylphosphine or the like with a quaternary ammonium salt catalyst is also effective.

The suitable use amount of the epoxy group ring opening catalyst is within the range of up to 5 parts by weight per 100 parts by the solid weight of the vinyl copolymerization resin.

Further, as the curing agents (D) capable of reacting with a hydroxyl group, known and conventional ones such as amino resins, acid anhydride group containing compounds, isocyanate prepolymers and blocked polyisocyanates are particularly representative.

Among them, particularly representative examples of the amino resins include melamine resins, benzoguanamine resins and urea resins and the like, and mentioned as specific examples are those obtained by addition condensing formaldehyde and an aliphatic alcohol with melamine, benzoguanamine or urea as a main component.

In the above, particularly representative examples of the aliphatic alcohol used for etherification are methanol, ethanol, isopropanol, n-butanol and the like, and they are used in combination.

Particularly representative examples of the acid anhydride group containing compound are those obtained by copolymerizing an acid anhydride group containing polymerizable unsaturated monomer such as maleic anhydride or itaconic anhydride with a copolymerizable unsaturated monomer as mentioned above, i.e. another copolymerizable vinyl monomer (a-4).

Further, particularly representative examples of the low molecular compound are trimellitic acid, tetrahydrophthalic anhydride, hexahydrophthalic anhydride, HET anhydride, himic anhydride, maleic anhydride, itaconic anhydride, pyromellitic anhydride, glycerol tris(trimellitate), ethylene glycol di(trimellitate), etc.

Further, particularly representative examples of the isocyanate prepolymer include aromatic diisocyanates such as tolylene diisocyanate and diphenylmethane diisocyanate; aliphatic diisocyanates such as hexamethylene diisocyanate and trimethylhexane diisocyanate; and alicyclic diisocyanates such as isophorone diisocyanate, methylcyclohexane-2,4(or 2,6)-diisocyanate, 4,4'-methylenebis(cyclohexyl isocyanate) and 1,3-(isocyanatomethyl)cyclohexane; adducts of one of these diisocyanates with a polyhydric alcohol such as ethylene glycol, polyether polyol (polyethylene glycol, polypropylene glycol, polycaprolactone polyol or the like), trimethylolethane and trimethylolpropane, a low molecular weight polyester resin (including an oil-modified type) or acrylic copolymer having a functional group reactive with an isocyanato group, water or the like; buret products, copolymers of diisocyanates themselves (oligomers); copolymers obtained using as an indispensable component a vinyl monomer having an unsaturated group copolymerizable with the isocyanate group of 2-hydroxypropyl(meth)acrylatehexamethylene diisocyanate equimolar adduct, isocyanatoethyl methacrylate or the like; polyisocyanates having an isocyanurate ring and being soluble in a non-polar organic solvent obtained by reacting an alkylene of $C_2$ to $C_8$, cycloalkylene or aralkylene diisocyanate with a diol of $C_{10}$ to $C_{40}$ in the presence of an isocyanurate catalyst as disclosed in Japanese Laid-Open Patent Publication No. 72013/1986; and the like.

Further, if desired, it is also possible to use an isocyanatoalkylalkoxysilane having an isocyanato group and a hydrolyzable silyl together, for example, -isocyanatopropyltriethoxysilane or KBM-9007, 907, KBE-9007 or 9207 (produced by Shin-Etsu Chemical Co., Ltd.).

The blocked polyisocyanate is obtained by reacting one of various polyisocyanates and isocyanate prepolymers with a blocking agent in a conventional manner. Particularly representative examples of a block agent used therein include phenol compounds such as phenol, cresol and xylenol; alcohol compounds such as methanol, ethanol, isopropanol, n-butanol and benzyl alcohol; active methylene compounds such as dimethyl malonate, ethyl acetoacetate and acetylacetone; oxime compounds such as acetone oximes and ketone oximes represented by formaldoxime, acetoaldoxime and methyl ethyl ketone oxime (butanone oxime); imidazoles such as 2-methylimidazole; and so on.

The pertinent use amount of the curing agent (D) is within the range such that the ratio of (D)/vinyl polymer is 1 to 40 parts by weight/10 to 90 parts by weight, preferably 5 to 30 parts by weight/20 to 70 parts by weight.

The pertinent use ratio of the vinyl polymer: the compound having a carboxyl group and a hydroxyl group:the curing agent having reactivity with a hydroxyl group is within the range of 10 to 90:5 to 90:1 to 40 (weight ratio), preferably 20 to 70:10 to 60:5 to 30 weight ratio.

In this connection, the use ratio of the curing agent (D) is determined by the content of the hydroxyl group existing in the other components. When the use ratio in the composition of the invention exceeds 40% by weight, the characteristics of the vinyl polymer which are based on the cyclocarbonate crosslinking are lost, and such a case is not preferred.

The thus obtained thermosetting resin composition of the invention can be used as it is as a clear coating, and can also be used as an enamel coating after compounding of a pigment.

Further, if necessary, known and conventional various additives such as a leveling agent, an ultraviolet absorber and a pigment dispersing agent can be compounded into the composition of the invention.

Furthermore, a cellulose compound, a plasticizer, a polyester resin and the like which are known and conventional may also be added to and compounded into the composition of the invention.

As the coating method of the thermosetting resin composition of the invention, a known and conventional method such as brush coating, spray coating or roll coating can be adopted, and as for the curing method, a method ranging from so-called compulsory drying to baking curing at a temperature within the broad range of 60° to 180° C. can be adopted. The amount ratio of the cyclocarbonate group existing in the vinyl copolymer as the indispensable coat-forming component of the composition of the invention to the carboxyl group or acid anhydride group existing in the specified compound can optimally be determined in accordance with the kind of the cyclocarbonate group decomposition catalyst, the combination of this cyclocarbonate group decomposition catalyst with the epoxy ring opening catalyst, etc.

The thermosetting resin composition of the invention to be thus obtained is an extremely useful one which is excellent, above all, in acid resistance, weather resistance and coat appearance such as smoothness, and the like.

The thermosetting resin composition of the invention can be utilized with automobile top coat and various metal materials as the central figure. Particularly in the fields where required level is not yet reached on aspect such as acid resistance, weather resistance and coat appearance, for example, in the fields of the acrylic resin/melamine resin coating system, remarkable effects thereof can be expected.

Further, this invention provides a novel aqueous thermosetting resin composition which utilizes the crosslinking reaction of 2-oxo-1,3-dioxolan-4-yl groups with carboxyl groups and/or carboxylate groups.

Heretofore, as aqueous thermosetting resin compositions such as coatings and adhesives, there have been put to practical use those obtained by neutralizing vinyl polymers, polyester resins, alkyd resins or polyurethane resins, having both hydroxyl groups and carboxyl groups, with basic compounds, dispersing or dissolving the resulting neutralized resin in water, and compounding into the resultant aqueous resins amino resins, blocked isocyanates or the like as curing agents.

However, cured products obtained from such compositions have disadvantages that they are poor in chemical resistance such as alkali resistance or acid resistance, water resistance, corrosion resistance, etc., and, as a matter of course, there were limitations about their use.

The aqueous thermosetting resin composition of this invention is one wherein the above disadvantages of the usual aqueous thermosetting resin compositions were improved, and is one having extremely high usefulness capable of giving cured products excellent in various performances such as chemical resistance, water resistance and corrosion resistance.

Namely, this invention provides (i) an aqueous thermosetting resin composition comprising an aqueous resin (W-1) obtained by neutralizing with a basic compound part of all of the carboxyl groups of a vinyl polymer (A-2) having at least one 2-oxo-1,3-dioxolan-4-yl group and at least one carboxyl group together on the polymer, and then dispersing or dissolving the resulting neutralized polymer in water; and a curing catalyst (B), (ii) an aqueous thermosetting resin composition comprising an aqueous resin (W-1) obtained by neutralizing with a basic compound part or all of the carboxyl groups of a vinyl polymer (A-2) having at least one 2-oxo-1,3-dioxolan-4-yl group and at least one carboxyl group together on the polymer, and dispesing or dissolving the resulting neutralizing polymer in water; an aqueous resin (W-2) obtained by neutralizing with a basic compound part or all of the carboxyl groups of a compound (C-2) having at least two carboxyl groups, and dispersing or dissolving the resulting neutralized compound in water; and a curing catalyst (B), (iii) an aqueous thermosetting resin composition comprising an aqueous resin (W-3) obtained by dispersing in water a vinyl polymer (A-1) having at least one 2-oxo-1,3-dioxolan-4-yl group on the polymer, and/or an aqueous solution or aqueous dispersion (W-4) of a compound (A-3) different from the above (A-1) and having at least two 2-oxo-1,3-dioxolan-4-yl groups; an aqueous resin (W-2) obtained by neutralizing with a basic compound part or all of the carboxyl groups of a compound (C-2) having at least two carboxyl groups and dispersing, or dissolving the neutralized compound in water; and a curing catalyst (B), and (iv) an aqueous thermosetting resin composition comprising an aqueous resin (W-1) obtained by neutralizing with a basic compound part of all of the carboxyl groups of a vinyl polymer (A-2) having at least one 2-oxo-1,3-dioxolan-4-yl group and at least one carboxyl group together on the polymer, and dispersing or dissolving the resulting neutralized polymer in water; an aqueous resin (W-3) obtained by dispersing in water a vinyl polymer (A-1) having at least one 2-oxo-1,3-dioxolan-4-yl group on the polymer, and/or an aqueous solution or aqueous dispersion (W-4) of a compound (A-3) different from the above (A-1) and having at least two 2-oxo-1,3-dioxolan-4-yl group; and a curing catalyst (B).

This invention further provides an aqueous thermosetting resin composition comprising any one of the above (i) to (iv) compositions having compounded thereinto a specific curing agent (D) capable of reacting with a hydroxyl group.

The above aqueous resin (W-1) means, as is described above, a resin obtained by neutralizing with a basic compound part or all of the carboxyl groups of a vinyl polymer (A-2) having at least one 2-oxo-1,3-dioxolan-4-yl group and at least one carboxyl group together on the polymer, and dispersing or dissolving the resulting neutralized polymer in water.

Typical examples of the above basic compound to be used in neutralization of the carboxyl groups of the vinyl polymer (A-2) are various alkali metal hydroxides such as sodium hydroxide, potassium hydroxide and lithium hydroxide; various alkali metal carbonate and bicarbonate salts such as sodium carbonate, potassium carbonate, lithium carbonate, sodium bicarbonate and potassium bicarbonate; various quaternary ammonium hydroxides such as tetraethylammonium hydroxide, tetra-n-butylammonium hydroxide and trimethylbenzylammonium hydroxide; and various tertiary amines such as trimethylamine, triethylamine, tri-n-propylamine, tri-n-butylamine, dimethylcyclohexylamine, dimethylbenzylamine, 2-dimethylaminomethanol, 1-dimethylamino-2-propanol and N-methylmorpholine. Above all, tertiary amines are desirable in view of the water resistance, chemical resistance, etc. of cured products.

In the neutralization, the basic compound may be added in quantity such that 20% or more, preferably 30% or more of the carboxyl groups in the vinyl polymer (A-2) are neutralized.

In obtaining an aqueous resin (W-1) from the thus obtained neutralization product of the vinyl polymer (A-2), various processes can be utilized, for example, ① a process which comprises adding to water an organic solvent solution of the neutralization product of the vinyl polymer (A-2) to give an aqueous dispersion or aqueous solution, and, if necessary, removing the organic solvent, ② a process which comprises adding an organic solvent solution of the neutralization product of the vinyl polymer (A-2) to water containing a protective colloid, an emulsifier or the like, and, if necessary, removing the organic solvent, ③ a process which comprises adding water containing a protective colloid, an emulsifier or the like to an organic solvent solution of the neutralization product of the vinyl polymer (A-2), and removing the solvent, etc.

The aqueous resin (W-2) means a resin obtained by neutralizing with a basic compound part or all of the carboxyl groups contained in a compound (c-2) having at least two carboxyl groups, provided that a polycarboxylic acid is excluded, namely a vinyl polymer or polyester resin having at least two carboxyl groups on the polymer, as is described above, and then dispersing or dissolving the resulting neutralized compound in water.

In preparation of the aqueous resin (W-2), it is not preferred to use a polycarboxylic acid as (c-2), because corrosion resistance is strikingly lowered.

In the preparation of (W-2), neutralization is carried out using the same basic compound as in preparation of the aforesaid aqueous resin (W-1), and an aqueous dispersion or aqueous solution is prepared in the same formulation as in preparation of the aqueous resin (W-1).

The aqueous resin (W-3) can be prepared, for example, by ① a process which comprises adding an organic solvent solution of the polymer (A-1) to water containing a protective colloid, an emulsifier or the like and dispersing the former into the latter, and then, if necessary, removing the organic solvent, ② a process which comprises adding water containing a protective colloid, an emulsifier or the like to an organic solvent solution of the polymer (A-1), and then removing the solvent, or ③ a process which comprises emulsion copolymerizing, according to a known and conventional method, monomers each having a 2-oxo-1,3-dioxolan-4-yl group (cyclocarbonate group) to be used in preparation of the polymer (A-1), or a mixture of a cyclocarbonate group-containing monomer with another monomer copolymerizable with the monomer.

The aqueous solution or aqueous dispersion (W-4) of the compound (A-3) having at least two 2-oxo-1,3-dioxolan-4-yl groups (cyclocarbonate groups) excluding the polymer (A-1) means an aqueous solution or aqueous dispersion of a polymer (A-3), other than a vinyl polymer, containing at least two cyclocarbonate groups on the polymer, or a relatively low molecular weight compound (A-3) having at least two 2-oxo-1,3-dioxolan-4-yl groups.

Particularly typical examples of such cyclocarbonate group-containing compounds (A-3) are various polymers such as polyester resins or polyurethane resins having 2-oxo-1,3-dioxolan-4-yl group(s) (cyclocarbonate group(s)), reaction products of low molecular weight polyisocyanate compounds with various compound having hydroxyl group(s) and 1,3-dioxolan-2-one group(s) together such as 4-hydroxymethyl-1,3-dioxolan-2-one, etc. Examples thereof further include low molecular weight compounds obtained by reacting various polyepoxycompounds such as poly(methyl)glycidyl ethers of polyhydric alcohols, poly(methyl)glycidyl esters of polycarboxylic acids or di(methyl)glycidyl ether type epoxy resins of bisphenol A or bisphenol F with carbon dioxide in the presence of a catalyst, as is shown in the following the reaction formula

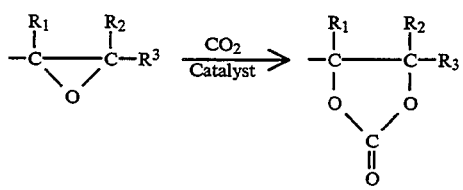

wherein $R_1$, $R_2$ and $R_3$ may be the same or different and each represent a hydrogen atom or an alkyl group having 1 to 4 carbon atoms.

When the (A-3) component itself is water soluble, it is possible to obtain the composition of this invention by dissolving it as such in water, and when the component is not water soluble, it is possible to obtain the composition of this invention by compulsorily dispersing it in water, if necessary with use of a dispersing agent, an emulsifier or the like.

As the aforementioned curing catalyst (B) to be added to the aqueous thermosetting resin composition of this invention, the aforementioned various ones can be used.

Particularly typical examples of the curing agent (D) capable of reacting with a hydroxyl group to be used in the aqueous thermosetting resin composition of the invention are amino resins, blocked isocyanate compounds, etc. When the curing agent is water soluble, as is the case with amino resins, the composition of the invention can be obtained by dissolving it as much in water, and when it is not water soluble, the composition of the invention can be obtained by compulsorily dispersing it in water, if necessary with addition of a dispersing agent, an emulsifier or the like.

In obtaining the aqueous thermosetting resin composition (i) of this invention from the aqueous resin (W-1) and the curing catalyst (B), the (B) component may be added in a ratio of 0.2 to 60 mmol, preferably 0.5 to 40 mmol per 100 g of the solid component of the (W-1) component.

In obtaining the aqueous thermosetting resin composition (ii) of this invention from the aqueous resin (W-1), the aqueous resin (W-2) and the curing catalyst (B), the (B) component may be added in a ratio of 0.2 to 60 mmol, preferably 0.5 to 40 mmol per 100 g of the solid components of a composition comprising the (W-1) component and the (W-2) component in a solid component weight ratio of 95:5 to 5:95, preferably 90:10 to 10:90.

In obtaining the aqueous thermosetting resin composition (iii) from the aqueous resin (W-3) and/or the aqueous resin (W-4), the aqueous resin (W-2) and the curing catalyst (B), the (B) component may be added in a ratio of 0.2 to 60 mmol, preferably 0.5 to 40 mmol per 100 g of the solid components of a composition of the (W-3) component and/or the (W-4) component with the (W-2) component in a solid component weight ratio of 97:3 to 3:97, preferably 95:5 to 5:95.

In obtaining the aqueous thermosetting resin composition (iv) of this invention from the aqueous resin (W-1), the aqueous resin (W-3) and/or the aqueous resin (W-4), and the curing catalyst (B), the (B) component can be added in a ratio of 0.2 to 60 mmol, preferably 0.5 to 40 mmol per 100 g of the solid components of a composition of the (W-1) component with the (W-3) component and/or the (W-4) component in a solid component weight ratio of 97:3 to 3:97, preferably 95:5 to 5:95.

In obtaining the aqueous thermosetting resin composition of this invention by compounding a curing agent (D) reacting with a hydroxyl group into an aqueous composition (i), (ii), (iii) or (iv), the (D) component may be compounded in a range of 1 to 50 weight parts, preferably 3 to 40 weight parts per 100 weight parts of the solid components of the composition (i), (ii), (iii) or (iv).

Known and conventional additives such as pigments can also be compounded into the aqueous thermosetting resin composition of this invention.

The thus obtained aqueous thermosetting resin composition of this invention can be applied onto substrates according to a known and conventional method as described above, and cured under the aforementioned conditions to give cured products excellent especially in chemical resistance, water resistance, corrosion resistance, etc.

Thus, the composition of this invention has a large merit that it can effectively be utilized in uses such as coatings and adhesives in place of usual hydroxyl group-containing resin-based aqueous curable resin compositions containing amino resins or blocked isocyanates as curing agents.

The present invention is further specifically described according to referential examples, examples and comparative examples. In the following, all parts and % are based on weight unless otherwise defined.

REFERENTIAL EXAMPLE 1

(Preparation example of a vinyl copolymer containing a cyclocarbonate group in the molecule)

500 parts of xylene and 300 parts of butanol were charged into a four-necked flask equipped with a thermometer, a condenser, an agitator and a nitrogen gas introducing tube, and the mixture was heated up to 120° C. A mixture consisting of 300 parts of 2-methyl-2,3-carbonatoproplyl methacrylate, 200 parts of methyl methacrylate, 200 parts of styrene and 300 parts of n-butyl methacrylate, and a mixture consisting of 200 parts of xylene, 10 parts of azobisisobutyronitrile (AIBN) and 20 parts of tert-butyl peroxy-2-ethylhexanoate were added dropwise thereto over a period of 5 hours. After completion of the dropwise addition, the resulting mixture was maintained at the temperature for 7 hours to continue the reaction, whereby a solution of the desired resin having a number average molecular weight of 11,000 was obtained which solution has a non-volatile matter content of 50.4% and a Gardner viscosity at 25° C. (hereinafter abbreviated as viscosity) of M-N. Hereinafter this resin solution is referred to as resin (A-1-1).

REFERENTIAL EXAMPLE 2

(Same as above)

A solution of the desired resin having a non-volatile matter content of 50.6% and a viscosity of X was obtained in the same manner as in Referential example 1 except that a mixture consisting of 150 parts of 2,3-carbonatebutyl acrylate, 150 parts of styrene, 450 parts of isobutyl methacrylate, 150 parts of 2-ethylhexyl methacrylate, 50 parts of 2,3-carbonatepropyl acrylate and 50 parts of 2-hydroxyethyl methacrylate was used as a monomer mixture. Hereinafter, this is referred to as resin (A-1-2).

REFERENTIAL EXAMPLE 3

(Same as above)

A solution of the desired resin having a non-volatile matter content of 50.3%, a viscosity of Q and a number average molecular weight of 10,000 was obtained in the same manner as in Referential example 1 except that a mixture consisting of 300 parts of 2,3-carbonatebutyl allyl ether, 500 parts of vinyl acetate and 200 parts of "Veova" (a vinyl ester of a branched aliphatic monocarboxylic acid whose alkyl group has 9 carbon atoms produced by Scher Chemicals, Inc., the Netherlands) was used as a monomer mixture. Hereinafter, this is referred to as resin (A-1-3).

REFERENTIAL EXAMPLE 4

(Preparation example of a vinyl copolymerization resin containing carboxyl groups in the molecule)

A solution of the desired resin having a non-volatile matter content of 50.2% and a viscosity of 0 was obtained in the same manner as in Referential Example 1 except that a mixture consisting of 300 parts of acrylic acid, 300 parts of styrene and 400 parts of n-butyl methacrylate as a monomer mixture, and 15 parts of AIBN and 70 parts of tert-butyl peroxy-2-ethylhexanoate as initiators were used, respectively. Hereinafter, this is referred to as resin (C-2-1).

REFERENTIAL EXAMPLE 5

(Preparation example of a polyester resin containing carboxyl groups in the molecule)

500 parts by weight of "Placcel 308" (a polyol by polymerization of caprolactone produced by DAICEL CHEMICAL INDUSTRIES, LTD.) and 87 parts of phthalic anhydride were charged into 100 parts of xylene and 50 parts of butyl acetate, and reaction was carried out at 120° C. for 2 hours to obtain a solution of the desired resin having a non-volatile matter content of 80% and a viscosity of Q. Hereinafter, this is referred to as resin (C-2-2).

EXAMPLES 1 TO 8

Thermosetting resin compositions of the invention, namely one-can baking clear coatings were obtained using the cyclocarbonate group containing resin solutions obtained in Referential examples 1 to 3, the carboxyl group containing vinyl copolymerization resin and the carboxyl group containing polyester resin obtained in Referential examples 4 and 5, respectively, glyceroltris (trimellitate) as carboxyl groups containing and/or an acid anhydride group containing compound, a cyclocarbonate group decomposition catalyst, and if necessary an epoxy group ring opening catalyst according to the compounding composition ratios shown in Table 1.

REFERENTIAL EXAMPLES 1 TO 3

A control coating composition (Comparative example 1 product) consisting solely of the cyclocarbonate group containing resin solution obtained in Referential example 1, and a control coating composition (Comparative example 2 product) consisting solely of the cyclocarbonate group containing resin solution obtained by Referential example 1 and the carboxyl group containing vinyl copolymerization resin obtained by Referential example 4 were prepared.

As Comparative example 3 was prepared a control vinyl copolymerization resin/melamine resin coating wherein "Acrydic 52-748" (an acrylic resin produced by DAINIPPON INK AND CHEMICALS, INCORPORATED) and "Super Beckamine L-117-60" (a melamine resin produced by the above company) as usual commercial products were compounded in a compounding composition ratio of 70/30 (solid matter weight ratio).

Each thermosetting resin composition was separately spray applied onto a zinc phosphate-treated steel plate and then baked in accordance with the condition indicated in Table 1 to obtain a cured coat, which was then evaluated for the various coat performances of the items indicated in Table 1. Their results were shown in Table 1.

The ring opening catalysts in Table 1 one as follows:
Compound 1-1: Trimethylbenzylammonium hydroxide
Compound 1-2: 2-Hydroxypyridine
Compound 1-3: Triethylammonium chloride
Compound 2-1: Triphenylphosphine
Compound 2-2: 2-Methylimidazole

TABLE 1 (1)

| | | | Example 1 | 2 | 3 | 4 | 5 | 6 | 7 | 8 |
|---|---|---|---|---|---|---|---|---|---|---|
| Coating com- pounding composi- tion ratio (Parts) | Resin | Resin (A-1-1) | 1,000 | | | 1,000 | 1,000 | 1,000 | 1,000 | |
| | | Resin (A-1-2) | | 1,000 | | | | | | 1,000 |
| | | Resin (A-1-3) | | | 1,000 | | | | | |
| | Curing agent | Resin (C-2-1) | 450 | | | | | | 400 | |
| | | Resin (C-2-2) | | 235 | | 400 | | | | |
| | | Glyceroltris (trimellitate) | | | 176 | | 160 | | | 150 |
| | Ring opening catalyst | Compound 1-1 | 10 | | | | 5 | 5 | | |
| | | Compound 1-2 | | 5 | | 5 | | | | 4 |
| | | Compound 1-3 | | | 7 | | | | 5 | |
| | | Compound 2-1 | | 5 | 3 | | | 5 | | 2 |
| | | Compound 2-2 | | | | 1 | 1 | | | |
| Baking condition (°C./min.) | | | | | 130/20 | | | | 100/20 | 120/20 |
| Gel matter ratio (%) | | | 98.0 | 96.6 | 95.8 | 98.2 | 96.8 | 98.0 | 98.0 | 98.8 |
| Various coat perform- ances | Hardness | | 2H | 2H | H | 2H | 2H | F | 2H | H |
| | Erichsen value | | 6.8 | 6.5 | >7 | 6.2 | 6.5 | >7 | 6.5 | 6.2 |
| | Water resistance | | | | | Good | | | | |
| | Xylene rubbing | | | | | No change | | | | |
| | Chemical resistance | 5% $H_2SO_4$ | | | | Good | | | | |
| | | 5% NaOH | | | | Good | | | | |
| | Weather resistance | QUV test 2,000 hours | 85 | 90 | 99 | 92 | 88 | 85 | 88 | 90 |
| | | Outdoor exposure | 90 | 90 | 97 | 93 | 90 | 85 | 92 | 80 |
| | Film appearance | | | | | Good | | | | |

TABLE 1 (2)

| | | | Comparative Example 1 | Comparative Example 2 | Comparative Example 3 |
|---|---|---|---|---|---|
| Coating com- pounding composi- tion ratio | Resin | Resin (A-1-1) | 1,000 | 1,000 | one-can clear paint of acrylic resin/ melamine resin for baking |
| | | Resin (A-1-2) | | | |
| | | Resin (A-1-3) | | | |
| | Curing agent | Resin (C-2-1) | | 450 | |
| | | Resin (C-2-2) | | | |
| | | Glyceroltris | | | |

TABLE 1-continued

| | | | (2) | | |
|---|---|---|---|---|---|
| | | | Comparative Example 1 | Comparative Example 2 | Comparative Example 3 |
| (Parts) | Ring opening catalyst | (trimellitate) Compound 1-1 Compound 1-2 Compound 1-3 Compound 2-1 Compound 2-2 | | | |
| Baking condition (°C./min.) | | | 130/20 | | 150/20 |
| Gel matter ratio (%) | | | 0 | | 92.8 |
| Various coat perform- ances | Hardness | | Softer than 6B | | H |
| | Erichsen value | | >7 | >1 | 5.8 |
| | Water resistance | | Whitened | | Good |
| | Xylene rubbing | | Dissolved | | No change |
| | Chemical resistance | 5% H₂SO₄ | | There is in trace | |
| | | 5% NaOH | Dissolved | | Good |
| | Weather resistance | QUV test 2,000 hours | 5 | 20 | 35 |
| | | Outdoor exposure | 10 | 35 | 80 |
| | Film appearance | | Good | | Minute skin |

REFERENTIAL EXAMPLE 6

(Preparation example of a vinyl copolymerization resin having a cyclocarbonate group and a carboxyl group together in the molecule)

200 parts of a mixture consisting of 200 parts of 2,3-carbonatepropyl methacrylate, 220 parts of methyl methacrylate, 200 parts of styrene, 250 parts of n-butyl methacrylate and 130 parts of methylacrylic acid, 500 parts of toluene, 200 parts of n-butanol, 12 parts of tert-butyl peroxy octoate (TBPO), and 5 parts of azobisisobutyronitrile (AIBN) were charged into a four-necked flask equipped with a thermometer, a condenser, an agitator and a nitrogen gas introducing tube. The mixture was maintained at 90° C. for 30 minutes and then heated up to 115° C. over a period of 30 minutes, and a mixture consisting of 800 parts of the remaining monomer mixture, 300 parts of isobutyl acetate, 12 parts of TBPO and 5 parts of AIBN was added thereto at that temperature over a period of 4 hours. After completion of the dropwise addition, the mixture was maintained at that temperature for 10 hours to continue the reaction, whereby a solution of the desired resin having a non-volatile matter content of 50.9%, a viscosity of Y-Z and a number average molecular weight of 12,000 was obtained. Hereinafter, this is referred to as resin (A-2-1).

REFERENTIAL EXAMPLE 7

(Same as above)

A solution of the desired resin having a non-volatile matter content of 50.6%, a viscosity of Z₁ and a number average molecular weight of 14,000 was obtained in the same manner as in Referential example 6 except that a mixture consisting of 150 parts of 2,3-carbonatepropyl monomaleate, 250 parts of styrene, 200 parts of n-butyl methacrylate, 150 parts of lauryl methacrylate, 130 parts of methyl methacrylate and 20 parts methacrylic acid was used as a monomer mixture. Hereinafter, this is referred to as resin (A-2-2).

REFERENTIAL EXAMPLE 8

(Same as above)

A solution of the desired resin having a non-volatile matter content of 50.3%, a viscosity of S-T and a number average molecular weight of 10,000 was obtained in the same manner as in Referential example 6 except that a mixture consisting of 300 parts of 2,3-carbonatebutyl allyl ether, 400 parts of vinyl acetate, 100 parts of "Veova 9", a vinyl ester of a branched aliphatic monocarboxylic acid (Shell Co.), and 200 parts of adipic acid monovinyl ester was used as a monomer mixture. Hereinafter, this is referred to as resin (A-2-3).

EXAMPLES 9 TO 16

Coating resin compositions of the invention, namely one-can backing clear coatings were obtained using the respective resin solutions obtained in Referential examples 6 to 8, cyclocarbonate group decomposing catalysts, and if necessary epoxy group ring opening catalysts according to the compounding composition ratio indicated in Table 2.

COMPARATIVE EXAMPLE 4

A control resin composition was prepared wherein only the resin obtained in Referential example 6 was used. A curing catalyst was omitted.

The respective coatings obtained in the Examples and Referential examples were separately applied onto steel plates (0.6 mm×70 mm×150 mm) which had been treated with "Bondelite No. 144", a phosphate-containing treating agent for forming a protective coating of phosphate on the surface of iron products, to a film thickness of about 40 μm.

Then, the applied coatings were baked in the predetermined baking conditions to obtain cured coats.

The respective coatings and the respective cured coats obtained using these respective coatings were evaluated for various performances.

Those results are shown in Table 2.

Evaluations of the various performances of the coatings and the various performances of the cured coats were carried out under the following conditions.
Stability of the coating composition
After preservation at 50° C. for 7 days, the degree of the viscosity change of the coating was observed.
Clarity of the film
The transparency of the film after curing under the baking condition indicated in Table 2 was judged by visual observation.
Gel matter ratio
The coat after being cured under the baking condition indicated in Table 2 (cured coat) was immersed in acetone at room temperature over a period of 24 hours, and then the insoluble matter was measured.
Hardness This was expressed by the hardness immediately before the coat was damaged using Mitsubishi pencils "Uni".

Erichsen value

This was measured using an Erichsen tester and expressed by "mm".

Water resistance

This was judged by visually observing the degree of the state change of the coat after immersion in warm water of 50° C. for 24 hours.

Xylene rubbing

A felt cloth was impregnated with xylene, and used to rub the coat 10 times. Changes in the state of the coat were judged by visual observation.

Chemical resistance

The coat was immersed separately in 5% H2SO4 and 5% NaOH aqueous solutions respectively at 40° C. for 24 hours, and then changes in the state of the coats were judged by visual observation.

Weather resistance

Both QUV test and outdoor exposure were carried out;

QUV test

Gloss retention ratio after a 2,000 hours accelerating weathering test using a weatherometer produced by Q-Panel Co., U.S.A. was expressed by "%".

Outdoor exposure

Gloss retention ratio after two years of outdoor exposure with an angle as the inclination of the exposure stand of 5°0 at the suburbs of Bangkok, Thailand was expressed by "%".

Coat appearance

Each coating was separately spray coated onto a glass surface and baked, and then the smoothness of the skin of the cured coat was judged by visual observation.

except that 300 parts of n-butyl methacrylate was used and 100 parts of 2-hydroxyethyl acrylate was additionally used.

REFERENTIAL EXAMPLE 10

(Preparation example of a vinyl copolymerization resin having a cyclocarbonate group and a hydroxyl group in the molecule)

A solution of the desired resin having a non-volatile matter content of 50.8%, a viscosity of R and a number average molecular weight of 8,000 was obtained in the same manner as in Referential example 1 except that a mixture consisting of 300 parts of 3,4-carbonatebutyl allyl ether, 500 parts of vinyl acetate, 100 parts of "Veova 9" and 100 parts of allyl alcohol was used as a monomer mixture. Hereinafter, referred to as resin (A-1-4).

EXAMPLES 17 AND 18 AND COMPARATIVE EXAMPLES 5 TO 6

Thermosetting resin compositions, namely one-cap baking clear coatings were obtained in the same manner as in Examples 1 to 8 except that the compounding composition was changed into a compounding composition shown in Table 3.

The resulting respective resin compositions were separately spray applied onto zinc phosphate-treated steel plates, and the baked in accordance with the conditions indicated in Table 3 to obtain cured coats, which were then evaluated for the various coat performances of the items indicated in Table 3. Those results were shown in Table 3.

TABLE 2

| | | | Example | | | | | | | | Comparative example |
|---|---|---|---|---|---|---|---|---|---|---|---|
| | | | 9 | 10 | 11 | 12 | 13 | 14 | 15 | 16 | 4 |
| Coating compounding composition ratio (Parts) | Resin | Resin (A-2-1) | 1,000 | | | 1,000 | 1,000 | | | 1,000 | 1,000 |
| | | Resin (A-2-2) | | 1,000 | | | | 1,000 | | | |
| | | Resin (A-2-3) | | | 1,000 | | | | 1,000 | | |
| | Ring opening catalyst | Phosphoric acid | 5.0 | | | 5.0 | | | | 8.0 | |
| | | Triethylammonium chloride | | 3.0 | | | 3.5 | | | | |
| | | Potassium carbonate | | | 5.0 | | | 7.0 | | | |
| | | p-Toluenesulfonic acid | | | | | | | 5.0 | | |
| | Ring opening catalyst | Triphenylphosphine | 5.0 | | 5.0 | | 2.0 | | 5.0 | 8.0 | |
| | | 2-Methylimidazole | | 3.0 | | | | 2.5 | | | |
| Baking condition (°C./min.) | | | | | 100/30 | | | 120/20 | | 90/20 | 100/30 |
| Stability of the coating composition | | | | | | No change | | | | | No change |
| Clarity of the film | | | | | | Good | | | | | Good |
| Gel matter ratio (%) | | | 98.2 | 97.2 | 98.2 | 96.5 | 96.2 | 98.4 | 97.5 | 98.4 | 15.2 |
| Coat performance | Hardness | | 2H | 2H | H | 2H | 2H-H | H | H | 2H | 4B |
| | Erichsen value (nm) | | 3.4 | 4.2 | 6.2 | 5.2 | 4.8 | 3.0 | 4.9 | 3.0 | <1 |
| | Water resistance | | | | | Good | | | | | Whitening |
| | Xylene rubbing | | | | | No Good | | | | | Dissolved |
| | Chemical resistance | 5% H2SO4 | | | | Good | | | | | There is in trace. |
| | | 5% NaOH | | | | Good | | | | | Partly dissolved |
| | Weather resistance | QUV test 2,000 hrs. | 65 | 68 | 80 | 72 | 68 | 70 | 78 | 82 | 20 |
| | | Outdoor exposure | 90 | 90 | 82 | 83 | 85 | 82 | 83 | 85 | 35 |
| | Coat appearance | | | | | Good | | | | | Good |

REFERENTIAL EXAMPLE 9

(Preparation example of a vinyl copolymerization resin having a carboxyl group and a hydroxyl group in the molecule)

A solution of the desired resin (C-1-1) having a non-volatile matter content of 50.25 and a viscosity of P was obtained in the same manner as in Referential example 4

TABLE 3

| | | Example | | Comparative example | |
|---|---|---|---|---|---|
| | | 17 | 18 | 5 | 6 |
| Resin (A) | A-1-2 | 1,000 | | 1,000 | |
| | A-1-4 | | 1,000 | | 450 |
| Compound (C) | C-1-1 | 450 | | | |
| | C-2-1 | | 400 | | |
| Curing Agent | "Super Beckamine | 100 | 150 | | |

TABLE 3-continued

| | | Example | | Comparative example | |
|---|---|---|---|---|---|
| | | 17 | 18 | 5 | 6 |
| (D) | L-117-60" | | | | |
| | "Barnock DN-950" | | 50 | | |
| Ring opening | Compound 1-1 | 10 | 5 | | |
| catalyst (B) | Compound 2-2 | | 1 | | |
| Baking condition (°C./min.) | | 130/30 | | 130/30 | |
| Gel matter ratio (%) | | 99.0 | 98.2 | 45 | 0 |
| Coating performances | Hardness | 2H | H | 3B | Softer than 6B |
| | Erichsen value (mm) | 5.6 | >7 | >7 | <1 |
| | Xylene rubbing | Good | | Dissolved | |
| | Scuffing resistance | Good | | Poor | |
| | Chemical resistance 5%-NaOH | Good | | There is in trace | |
| | 5%-H$_2$SO$_4$ | Good | | Dissolved | |
| | Weather resistance QUV test 2,000 hrs. | 88 | 88 | 35 | 20 |
| | Outdoor exposure 2 years | 92 | 83 | 56 | 35 |
| | Coat appearance | Good | | Good | |

As is apparent from Table 2, the coating resin composition of the invention is first excellent in stability as an one-can baking coating, and also excellent in acid resistance and weather resistance, compared to the conventional acrylic resin/melamine resin baking coatings.

The thermosetting resin composition of the invention is excellent in storage stability as a one-can coating and thus, of course, good in workability, and moreover, also excellent in acid resistance, weather resistance and coat appearance, particularly smoothness.

Therefore, it can be said that the thermosetting resin composition of the invention strikes out a new line as a baking coating.

REFERENTIAL EXAMPLE 11

[An example of preparation of an aqueous resin (W-1)]

66 parts of isopropyl alcohol was charged in a reaction vessel equipped with an agitator, a thermometer, a nitrogen-introducing tube, a cooling tube and a dropping funnel, and heated to 80° C. under a nitrogen atmosphere.

Then, a mixture was dropwise added over a period of 3 hours comprising 30 parts of methyl methacrylate, 25 parts of n-butyl methacrylate, 12 parts of n-butyl acrylate, 25 parts of 4-methacryloyloxymethyl-1,3-dioxolan-2-one, 8 parts of acrylic acid and 2 parts of t-butyl peroxy-2-ethylhexanoate.

Then, the mixture was held at the same temperature for 10 hours to give a solution, containing 60% nonvolatile matters, of a vinyl polymer having a number average molecular weight of 19,000 and having 2-oxo-1,3-dioxolan-4-yl groups and carboxyl groups together on the polymer.

Thereafter, 11.2 parts of triethylamine and 44.2 parts of isopropyl alcohol were added to this polymer solution and the mixture was sufficiently stirred to give a solution of the polymer whose carboxyl groups were neutralized by 100%.

Then, 148.3 parts of water was added to this solution to give a uniform solution. Further, part of isopropyl alcohol was removed under reduced pressure from this solution to give an aqueous resin solution containing 40% nonvolatile matters. Hereinafter, this is abbreviated as aqueous resin (W-1-1).

REFERENTIAL EXAMPLE 12

(The same as above)

In the same reactor as in Referential example 11, 66 parts of isopropyl alcohol was charged, and heated to 80° C. under a nitrogen atmosphere. Then, a mixture was dropwise added over a period of 3 hours comprising 30 parts of methyl methacrylate, 10 parts of styrene, 15 parts of n-butyl methacrylate, 10 parts of 2-ethylhexyl acrylate, 30 parts of mono (1,3-dioxolan-2-one-4-ylmethyl) ester of itaconic acid, 5 parts of 2-hydroxyethyl methacrylate, 34 parts of isopropyl alcohol and 4 parts of t-butyl peroxy-2-ethylhexanoate. Thereafter, the mixture was further held at the same temperature for 10 hours to give a solution, containing 50% nonvolatile matters, of a vinyl polymer having a number average molecular weight of 11,000 and having 2-oxo-1,3-dioxolan-4-yl groups and carboxyl groups together on the polymer.

To the thus obtained polymer solution, 9.3 parts of dimethylaminoethanol was added and the mixture was sufficiently stirred to give a solution of the polymer whose carboxyl groups were neutralized by 80%.

Then 150 parts of water was added to this solution with sufficient stirring to give a uniform solution.

Then, part of isopropyl alcohol was removed from this solution under reduced pressure to give an aqueous resin solution containing 40% nonvolatile matters. Hereinafter, this is abbreviated as aqueous resin (W-1-2).

REFERENTIAL EXAMPLE 13

(The same as above)

In the same reactor as in Referential example 11, 100 parts of methyl ethyl ketone was charged, and heated to 80° C. under a nitrogen atmosphere. Then, a mixture was dropwise added over a period of 5 hours comprising 30 parts of ethyl methacrylate, 20 parts of n-butyl acrylate, 10 parts of cyclohexyl methacrylate, 20 parts of 4-acryloyloxymethyl-4-methyl-1,3-dioxolan-2-one, 10 parts of methacrylic acid, 10 parts of 4-hydroxybutyl acrylate and 4 parts of t-butyl peroxy-2-ethylhexanoate. Thereafter, the mixture was further held at the same temperature for 10 hours to give a solution, containing 50% nonvolatile matters, of a vinyl polymer having a number average molecular weight of 6,000 and having 2-oxo-1,3-dioxolan-4-yl groups and carboxyl groups together on the polymer.

To the thus obtained polymer solution, 12 parts of triethylamine was added and the mixture was sufficiently stirred to give a solution of the polymer whose carboxyl groups were neutralized by 100%.

Then, 150 parts of water was added to this solution with sufficient stirring to give a dispersion. Then, methyl ether ketone was removed from this dispersion under reduced pressure to give an aqueous resin solution containing 40% nonvolatile matters. Hereinafter, this is abbreviated as aqueous resin (W-1-3).

REFERENTIAL EXAMPLE 14

(The same as above)

In a one-liter autoclave made of stainless steel whose atmosphere had sufficiently been replaced with nitrogen were charged 50 g of ethyl vinyl ether, 72 g of 4-vinyloxymethyl-1,3-dioxolan-2-one, 86 g of monovinyl adipate, 67 g of "Veober" (Vinyl ester of C$_9$ branched fatty acid, produced by Shell Co., Netherlands), 333 g of methyl ethyl ketone and 15 g of 2,2'-azobis (2,4-dimethylvaleronitrile). Then, 225 g of liquefied chlorotrifluoroethylene was charged, and the mixture was heated at 60° C. for 15 hours with stirring. Then, unreacted chlorotrifluoroethylene was purged to give a solution, containing 58% nonvolatile matters, of a vinyl polymer having a number average molecular weight of 15,000 and having 2-oxo-1,3-dioxolan-4-yl groups and carboxyl groups together.

To the thus obtained polymer solution, 51 g of triethylamine was added and the mixture was sufficiently stirred to give a solution of the polymer whose carboxyl groups were neutralized by 100%.

Then, 953 g of water was added to this solution with sufficient stirring to give a dispersion. Therefore, methyl ethyl ketone was removed from this dispersion under reduced pressure to give an aqueous resin dispersion containing 36% nonvolatile matters. Hereinafter, this is abbreviated as aqueous resin (W-1-4).

REFERENTIAL EXAMPLE 15

[An example of preparation of an aqueous resin (W-2)]

In the same reactor as in Referential example 11, 66 parts of isopropyl alcohol was charged, and heated to 80° C. under a nitrogen atmosphere. Then, a mixture was dropwise added over a period of 3 hours comprising 10 parts of styrene, 20 parts of methyl methacrylate, 35 parts of n-butyl methacrylate, 20 parts of n-butyl acrylate, 15 parts of acrylic acid and 4 parts of tert-butyl peroxy-2-ethylhexanoate.

Successively after completion of the dropwise addition, the resultant mixture was held at the same temperature for 10 hours to give a solution, containing 60.0% nonvolatile matters, of a carboxyl group-containing acrylic polymer having a number average molecular weight of 14,000.

To the thus obtained polymer solution, 21 parts of triethylamine and 100 parts of isopropyl alcohol were added and the mixture was sufficiently stirred to give a solution of the polymer whose carboxyl groups were neutralized by 100%.

Then, 150 parts of deionized water was added to this solution with stirring to give a uniform solution.

Thereafter, part of isopropyl alcohol and water was distilled away from this solution under reduced pressure to give a water-isopropyl alcohol solution of a vinyl polymer, containing 40% nonvolatile matters. Hereinafter, this is abbreviated as aqueous resin (W-2-1).

REFERENTIAL EXAMPLE 16

(The same as above)

66 parts of isopropyl alcohol was charged in the same reactor as in Referential example 11 and heated to 80° C. under a nitrogen atmosphere.

Then, a mixture was dropwise added over a period of 3 hours comprising 10 parts of styrene, 20 parts of methyl methacrylate, 20 parts of n-butyl methacrylate, 15 parts of 2-hydroxyethyl methacrylate, 20 parts of n-butyl acrylate, 15 parts of acrylic acid and 4 parts of tert-butyl peroxy-2-ethylhexanoate.

Successively after completion of the dropwise addition, the mixture was held at the same temperature for 10 hours to give a solution, containing 60.0% nonvolatile matters, of a carboxyl group-containing acrylic polymer having a number average molecular weight of 14,000.

To the thus obtained polymer solution, 21 parts of triethylamine and 100 parts of isopropyl alcohol were added and the mixture was sufficiently stirred to give a solution of the polymer whose carboxyl groups were neutralized by 100%.

Then, 150 parts of deionized water was added to this solution with stirring to give a uniform solution.

Thereafter, part of isopropyl alcohol and water was distilled away from this solution under reduced pressure to give a water-isopropyl alcohol solution of a vinyl polymer, containing 40% nonvolatile matters. Hereinafter, this is abbreviated as aqueous resin (W-2-2).

REFERENTIAL EXAMPLE 17

(The same as above)

In an one-liter autoclave made of stainless steel whose atmosphere had sufficiently been replaced with nitrogen were charged 70 g of ethyl vinyl ether, 86 g of monovinyl adipate, 119 g of "Veober 9" (vinyl ester of $C_9$ branched fatty acid, produced by Shell Co., The Netherland), 333 g of methyl ethyl ketone and 15 g of 2,2-azobis (2,4-dimethylvaleronitrile). Then, 225 g of liquefied chlorotrifluoroethylene was charged, and the mixture was heated for 15 hours with stirring. Then, unreacted chlorotrifluoroethylene was purged to give a solution, containing 57% nonvolatile matters, of a carboxyl group-containing fluoroolefin polymer having number average molecular weight of 14,000.

Then, 22.3 g dimethylaminoethanol was added and the resultant mixture was sufficiently stirred to give a solution of the polymer whose carboxyl groups were neutralized by 50%.

Thereafter, the whole quantity of this polymer solution was added to a mixture comprising 800 g of deionized water and 50 g of ethylene glycol monomethyl ether with sufficient stirring to give a dispersion. Then, methyl ethyl ketone was distilled away under reduced pressure to give an aqueous dispersion of a vinyl polymer, containing 38.1% nonvolatile matters. Hereinafter, this is abbreviated as aqueous resin (W-2-3).

REFERENTIAL EXAMPLE 18

(The same as above)

In the same reactor as in Referential example 11 were charged 1,134 parts of an adduct of 2,2-diethylpropylene glycol and ε-caprolactone in a mole ratio of 1:2, 672 parts of hexamethylene diisocyanate, 268 parts of dimethylolpropionic acid, 3,411 parts of methyl ethyl ketone and 2 parts of dibutyltindilaurate. The resultant mixture was heated to 80° C. under a nitrogen atmosphere and subjected to reaction at the same temperature for 15 hours to give a solution of a polyurethane resin having hydroxyl groups at the both ends.

Then, 200 parts of succinic anhydride and 10 parts of diazabicyclooctane were added to this solution at the same temperature, and the mixture was subjected to reaction for 10 hours to give a solution of a polyurethane having carboxyl groups.

Thereafter, 202 parts of triethylamine was added to neutralize 50% of the carboxyl groups, 3,026 parts of deionized water was added with sufficient stirring to give a dispersion, and then, methyl ethyl ketone was distilled away under reduced pressure to give a dispersion of a polyurethane, containing 45% nonvolatile matters. Hereinafter, this is abbreviated as aqueous resin (W-2-4).

REFERENTIAL EXAMPLE 19

[An example of preparation of an aqueous resin (W-3)]

In the same reactor as in Referential example 11, 300 parts of deionized water was charged, and it was heated to 85° C. in a nitrogen atmosphere. Thereinto were dropwise added over a period of 2 hours an emulsion obtained by adding 30 parts of methyl methacrylate, 40 parts of n-butyl methacrylate, 15 parts of n-butyl acrylate and 15 parts of 4-methacryloyloxymethyl-1,3-dioxolan-2-one to a solution of 2.5 parts of sodium dodecylbenzenesulfonate in 50 parts of deionized water, and a solution obtained by dissolving 1 part of ammonium persulfate in 50 parts of deionized water.

Successively after completion of the dropwise addition, the mixture was held at the same temperature for one hour to complete polymerization, and thereby aqueous dispersion (emulsion), containing 20.0% nonvolatile matters, of a 2-oxo-1,3-dioxolan-4-yl group-containing vinyl polymer was obtained.

Hereinafter, this is abbreviated as aqueous resin (W3-1).

REFERENTIAL EXAMPLE 20

[An example of preparation of a curing agent (D) capable of reacting with hydroxyl groups]

In the same reactor as in Referential example 11 were charged 1,000 parts of "Burnock DN-980S" [an aliphatic polyisocyanate resin produced by DAINIPPON INK AND CHEMICALS, INC.; nonvolatile matters content=100%, isocyanato group content=20%], 331 parts of methyl ethyl ketoxime, 1.4 parts of di-n-butyl-tindilaurate and 1.473 parts of methyl ethyl ketone, and the resultant mixture was heated to 80° C. in a nitrogen atmosphere and then held at the same temperature for 10 hours.

Then, 142 parts of 2-hydroxymethyl-2-methoxymethylpropionic acid was added, and the mixture was subjected to reaction for 10 hours to give a solution, containing 50% nonvolatile matters, of a carboxyl group-containing blocked isocyanate resin.

Thereafter, for the purpose of neutralizing 100% of the thus introduced carboxyl groups, 96.9 parts of triethylamine was added, followed by sufficient stirring. Then, 1570 parts of deionized water was added to the thus obtained solution with sufficient stirring to give a dispersion.

Further, methyl ethyl ketone was distilled away from this dispersion under reduced pressure to give an aqueous dispersion of a blocked isocyanate resin, containing 50% nonvolatile matters.

Hereinafter, this is abbreviated as curing agent (D-1).

EXAMPLES 19 TO 30

The (W-1), (W-2), (W-3), (W-4), (D) and (B) components were compounded in ratios shown in Table 4 to prepare aqueous curable resin compositions.

As the (W-4) component was used a mixture of water and a compound, having three 2-oxo-1,3-dioxolan-4-yl grups in one molecule, of the formula

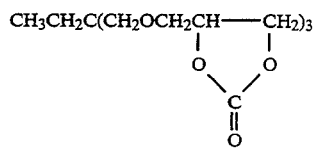

in an equal weight ratio.

As the (D) component was used the aforesaid D-1 or "Watersol S-695" [methyl-etherified methylolmelamine produced by DAINIPPON INK AND CHEMICALS, INC.; solvent=water, nonvolatile matters=66%].

As the (B) component was used trimethylbenzylammonium acetate (abbreviated as TBAA) or tetrabutyl phosphonium bromide (TBP).

Then, the thus obtained respective compositions were applied onto zinc phosphate-treated steel plates using doctor blade, and baked under the prescribed condition to give cured films each having a thickness of 40 μm. The cured films were evaluated for various performances, and the results were shown in Table 4.

COMPARATIVE EXAMPLES 7 TO 9

Aqueous resin (W-2-2) was used as a hydroxyl group-containing aqueous resin, and thereinto was compounded curing agent (D-1) or "Watersol S-695" in ratios shown in Table 4 to prepare curable resin compositions for comparison purpose.

Then, cured films were prepared from the respective compositions in the same manner as in Example 19 to 30, and then evaluated for various performances. The results are shown in Table 4.

Evaluation methods for the various performances shown in Table 4 are as follows.

"Water resistance" was evaluated by immersing each cured film in boiled water for 2 hours and then judging change in appearance of the film by visual observation.

"Corrosion resistance" was evaluated by storing each cured film to which cross out was given stirring for 100 hours in a salt spray tester which sprayed 5% sodium chloride aqueous solution at 35° C., and judging the state of occurrence of rust by visual observation.

"Solvent resistance (xylene rubbing)" and "chemical resistance" were evaluated in the same conditions as described previously with respect to Table 1 to 3.

TABLE 4

| | | (1-1-1) | | | |
| --- | --- | --- | --- | --- | --- |
| | | | Example 19 | Example 20 | Example 21 |
| Compounding | Aqueous resin component (W-1) | W-1-1 | 100 | | 100 |
| | | W-1-4 | | 100 | |
| | Aqueous resin component (W-2) | W-2-2 | | | 20 |
| | Aqueous resin component (W-3) | W-3-1 | | | |
| | Curing agent component (D) | D-1 | | | |
| | | S-695 | | | |
| | Curing catalyst component (B) | TBAA | 1.2 | | |
| | | TBP | | | |
| Curing condition (°C./min) | | | 160/20 | | |

TABLE 4

| | | (1-1-2) | | |
| --- | --- | --- | --- | --- |
| | | Example 19 | Example 20 | Example 21 |
| Various coat Performances | Solvent resistance (xylene rubbing) | Good (No change) | | |
| | Water resistance | Good (No change) | | |
| | Corrosion resistance | Good (slight occurrence of rust) | | |
| | Chemical resistance 5% NaOH | Good (No change) | | |
| | 5% H₂SO₄ | Good (No change) | | |

TABLE 4 (1-2-1)

|  |  |  | Example 22 | Example 23 | Example 24 |
|---|---|---|---|---|---|
| Compounding | Aqueous resin component (W-1) | W-1-4 |  |  | 100 |
|  | Aqueous resin component (W-2) | W-2-1 | 20 |  |  |
|  |  | W-2-3 |  |  | 100 |
|  | Aqueous resin component (W-3) | W-3-1 | 100 | 20 |  |
|  | Aqueous resin component (W-4) |  |  |  | 10.9 |
|  | Curing agent compondent (D) |  |  |  |  |
|  | Curing catalyst compondent (B) | TBAA | 0.8 |  | 1.3 |
|  |  | TBP |  | 1.2 |  |
| Curing condition (°C./min) |  |  | 160/20 | | |

TABLE 4 (1-2-2)

|  |  | Example 22 | Example 23 | Example 24 |
|---|---|---|---|---|
| Various coat performances | Solvent resistance (xylene rubbing) | Good (No change) | | |
|  | Water resistance | Good (No change) | | |
|  | Corrosion resistance | Good (slight occurrence of rust) | | |
|  | Chemical resistance 5% NaOH | Good (No change) | | |
|  | 5% H$_2$SO$_4$ | Good (No change) | | |

TABLE 4 (1-3-1)

|  |  |  | Example 25 | Example 26 | Example 27 |
|---|---|---|---|---|---|
| Compounding | Aqueous resin component (W-1) | W-1-2 | 100 |  |  |
|  |  | W-1-3 |  | 100 |  |
|  | Aqueous resin component (W-2) | W-2-1 |  |  | 20 |
|  |  | W-2-2 |  | 20 |  |
|  | Aqueous resin component (W-3) | W-3-1 |  |  | 100 |
|  | Curing agent component (D) | D-1 | 11.6 |  | 13.3 |
|  |  | S-695 |  | 12.8 |  |
|  | Curing catalyst Component (B) | TBAA | 1.4 |  |  |
|  |  | TBP |  | 1.7 | 1.0 |
| Curing condition (°C./min) |  |  | 140/20 | | |

TABLE 4 (1-3-2)

|  |  | Example 25 | Example 26 | Example 27 |
|---|---|---|---|---|
| Various coat Performances | Solvent resistance (xylene rubbing) | Good (No change) | | |
|  | Water resistance | Good (No change) | | |
|  | Corrosion resistance | Good (slight occurrence of rust) | | |
|  | Chemical resistance 5% NaOH | Good (No change) | | |
|  | 5% H$_2$SO$_4$ | Good (No change) | | |

TABLE 4 (1-4-1)

|  |  |  | Example 28 | Example 29 | Example 30 |
|---|---|---|---|---|---|
| Compounding | Aqueous resin component (W-1) | W-1-1 |  | 100 |  |
|  |  | W-1-4 |  |  | 100 |
|  | Aqueous resin component (W-2) | W-2-4 | 100 |  |  |
|  | Aqueous resin component (W-3) | W-3-1 |  |  | 20 |
|  | Aqueous resin component (W-4) |  | 12 | 5.6 |  |
|  | Curing agent component (D) | D-1 |  |  |  |
|  |  | S-695 | 13.6 | 20 | 13.4 |
|  | Curing catalyst component (B) | TBAA | 1.8 | 1.6 |  |
|  |  | TBP |  |  | 1.4 |
| Curing condition (°C./min) |  |  | 140/20 | | |

TABLE 4 (1-4-2)

|  |  | Example 28 | Example 29 | Example 30 |
|---|---|---|---|---|
| Variuos coat performance | Solvent resistance (xylene rubbing) | Good (No change) | | |
|  | Water resistance | Good (No change) | | |
|  | Corrosion resistance | Good (slight occurrence of rust) | | |
|  | Chemical resistance 5% NaOH | Good (No change) | | |
|  | 5% H$_2$SO$_4$ | Good (No change) | | |

TABLE 4 (1-5-1)

|  |  |  | Comparative example 7 | Comparative example 8 |
|---|---|---|---|---|
| Compounding | Aqueous resin component (W-1) |  |  |  |
|  | Aqueous resin component (W-2) | W-2-2 | 100 | 100 |
|  | Aqueous resin component (W-3) |  |  |  |
|  | Curing agent component (D) | D-1 | 38.1 |  |
|  |  | S-695 |  | 20.2 |
|  | Curing catalyst component (B) |  |  |  |
| Curing condition (°C./min) |  |  | 160/20 | |

TABLE 4 (1-5-2)

|  |  | Comparative example 7 | Comparative example 8 |
|---|---|---|---|
| Various coat performances | Solvent resistance (xylene rubbing) | Good (No change) | |
|  | Water resistance | Striking occurrence of rust | |
|  | Corrosion resistance | Striking occurrence of blister | |
|  | Chemical resistance 5% NaOH | Lowering of gloss | |
|  | 5% H$_2$SO$_4$ | Lowering of gloss | |

What is claimed is:

1. A thermosetting resin composition which comprises (A-2) a vinyl polymer having at least one each of a 2-oxo-1,3-dioxolan-4-yl group and a carboxyl group together on the polymer and a catalyst (B) effective for ring-opening the 2-oxo-1,3-dioxolan-4-yl group and curing said vinyl polymer.

2. A thermosetting resin composition which comprises (A-1) a vinyl polymer having at least one 2-oxo- 1,3-dioxolan-4-yl group on the polymer, (B) a ring-opening catalyst effective for curing said vinyl polymer, and (C-1) a compound having at least two carboxyl groups, and/or an acid anhydride group.

3. A thermosetting resin composition which comprises (A-1) a vinyl polymer having at least one 2-oxo-1,3-dioxolan-4-yl group on the polymer, (B) a ring-opening catalyst effective for curing said vinyl polymer, (C-2) a compound having at least two carboxyl groups, and (D) a curing agent capable of reacting with a hydroxyl group.

4. A thermosetting resin composition with comprises (A-2) a vinyl polymer having at least one each of a 2-oxo-1,3-dioxolan-4-yl group and a carboxyl group, (B) a ring-opening catalyst effect for curing said vinyl polymer, (C-2) a compound having at least two carboxyl groups, and (D) a curing agent capable of reacting with a hydroxyl group.

5. The composition of any one of claims 1 to 4 wherein the 2-oxo-1,3-dioxolan-4-yl group is one represented by the general formula

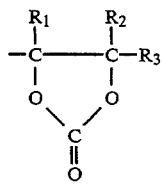

[I]

wherein $R_1$, $R_2$ and $R_3$, which may be identical or different, each represent a hydrogen atom or an alkyl group having 1 to 4 carbon atoms.

6. The composition of claim 2 or 3 wherein the vinyl polymer (A-1) having at least one 2-oxo-1,3-dioxolan-4-yl group is one having a hydroxyl group.

7. The composition of claim 1 or 5 wherein the vinyl polymer (A-2) having at least one each of a 2-oxo-1,3-dioxolan-4-yl group and a carboxyl group is one having a hydroxyl group.

8. The composition of claim 3 or 4 wherein the compound (C-2) having at least two carboxyl groups is one having a hydroxyl group.

9. The composition of claim 1 or 4 wherein the vinyl polymer (A-2) having at least one each of a 2-oxo-1,3-dioxolan-4-yl group and a carboxyl group together is one having a number average molecular weight within the range of 800 to 50,000 which is obtained by copolymerizing 1 to 70 parts by weight of a compound (a-1) having one alpha,beta-ethylenic unsaturated double bond and at least one 2-oxo-1,3-dioxolan-4-yl group together, 1 to 70 parts by weight of a vinyl monomer (a-2) having a carboxyl group, 5 or more parts by weight of a vinyl monomer (a-3) having a tertiary amino group, and 98 or less parts by weight of another copolymerizable vinyl monomer (a-4).

10. The composition of claim 3 or 4 wherein the curing agent (D) which is capable of reacting with a hydroxyl group is at least one compound selected from the group consisting of an amino resin, an isocyanate prepolymer, a block polyisocyanate and a polycarboxylic anhydride.

11. The composition of claim 2 wherein the compound (C-1) having at least two carboxyl groups and/or an acid anhydride group is at least one polymer selected from the group consisting of a vinyl polymer and, a polyester resin or a monomeric compound.

12. The composition of claim 9 wherein the vinyl polymer (A-2) has a number average molecular weight within the range of 1500 to 50,000.

13. The composition of any one of claims 1–4 wherein the ring opening catalyst is a cyclocarbonato group ring opening catalyst.

14. The composition of claim 13 wherein the ring opening catalyst is present in an amount of 0.01 to 5 parts by weight per 100 parts by weight of the vinyl polymer.

15. The composition of any one of claims 1–4 wherein the ring opening catalyst is an epoxy group ring opening catalyst.

16. The composition of claim 15 wherein the epoxy group ring opening catalyst is present in an amount up to 5 parts by weight per 100 parts by weight of the vinyl polymer.

17. A thermoset resin coating obtained by curing the thermosetting resin composition of any one of claims 1 to 4.

18. The composition of claim 1 wherein the vinyl polymer (A-2) further comprises an hydroxyl group.

19. The composition of claim 3 or 4 wherein the compound (C-2) is at least one polymeric compound selected from the group consisting of a vinyl polymer and a polyester resin or a monomeric compound having two carboxyl groups.

* * * * *